United States Patent
Kriebel

[11] 3,882,718
[45] May 13, 1975

[54] NONCONTACTING PRESSURE MEASURING APPARATUS

[75] Inventor: Anthony R. Kriebel, Menlo Park, Calif.

[73] Assignee: American Optical Corporation, Southbridge, Mass.

[22] Filed: May 5, 1971

[21] Appl. No.: 140,359

[52] U.S. Cl. .................................. 73/80; 73/71.3
[51] Int. Cl. ............................................. A61b 3/16
[58] Field of Search ........ 73/71.3, 80, 105; 128/2 T; 356/5, 120, 196, 209

[56] References Cited
UNITED STATES PATENTS

| | | | |
|---|---|---|---|
| 3,105,381 | 10/1963 | Collette | 73/71.3 X |
| 3,181,351 | 5/1965 | Stauffer | 73/80 |
| 3,498,717 | 3/1970 | Kumagai | 356/5 |
| 3,585,849 | 6/1971 | Grolman | 73/80 |
| 3,591,291 | 7/1971 | Greer et al. | 356/209 X |
| 3,613,666 | 10/1971 | Hobbs | 73/80 |

*Primary Examiner*—Jerry W. Myracle
*Attorney, Agent, or Firm*—H. R. Berkenstock, Jr.; William C. Nealon

[57] ABSTRACT

Apparatus for measuring internal pressure within a pressurized container having a deformable wall structure including a stimulus generator for developing oscillatory pressure waves for direction upon a surface of the container, a light source and associated optics for directing a beam of light upon the container surface to develop a reflected light beam, a light detector responsive to the reflected light beam for developing electrical signals commensurate with the surface deflection and an indicator responsive to the electrical signals for indicating a resonant frequency of the container; the resonant frequency providing an indication of the internal pressure within the container.

12 Claims, 6 Drawing Figures

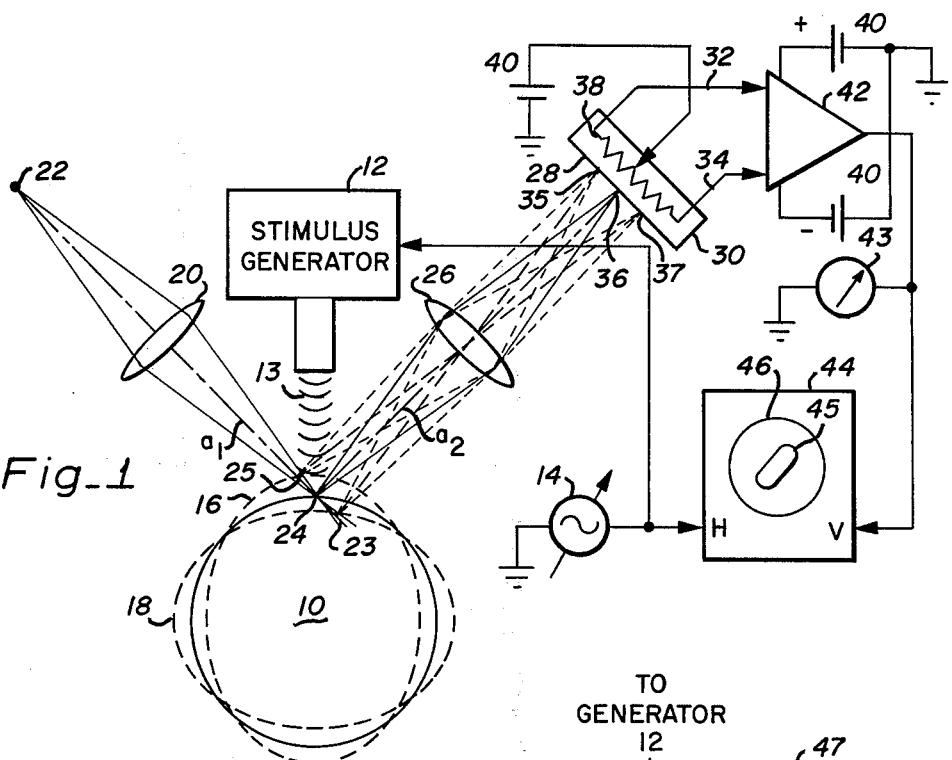
Fig_1
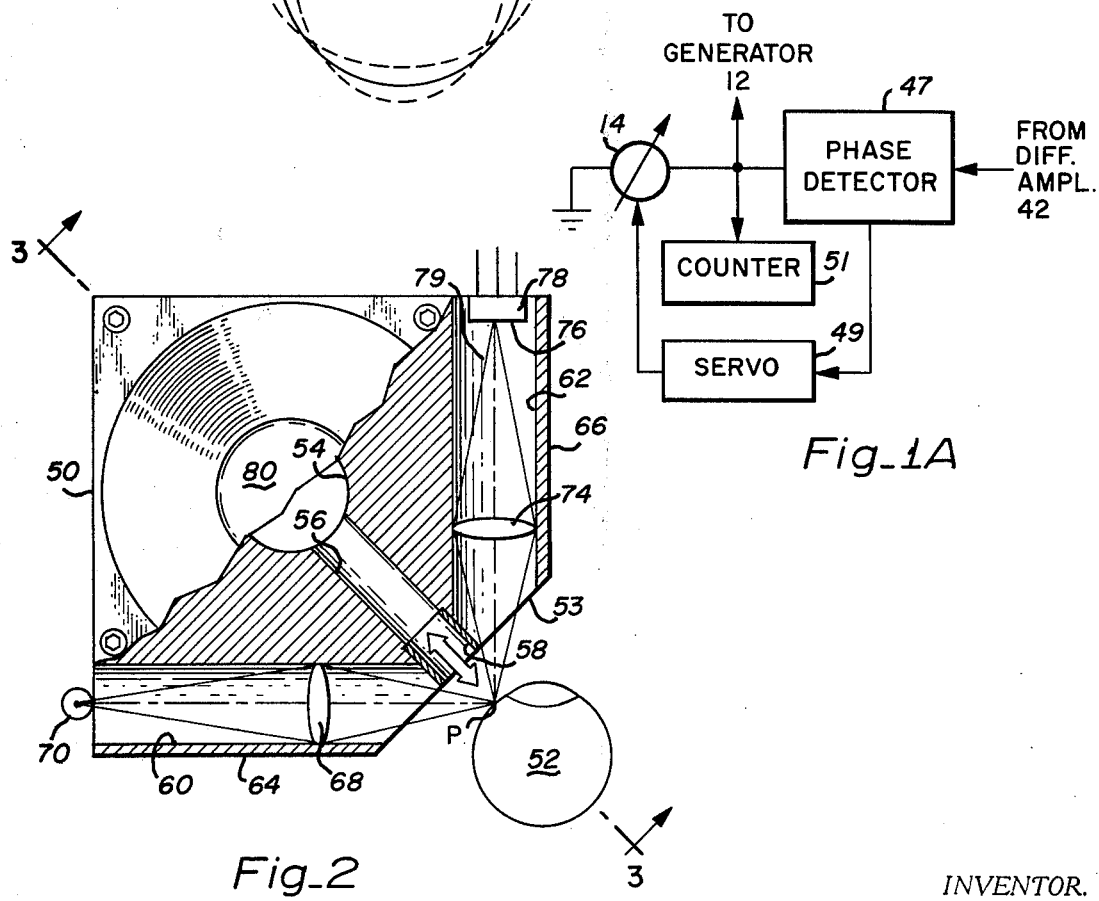
Fig_2
Fig_1A
INVENTOR.
ANTHONY R. KRIEBEL
BY
Lowhurst & Hamrick
ATTORNEYS

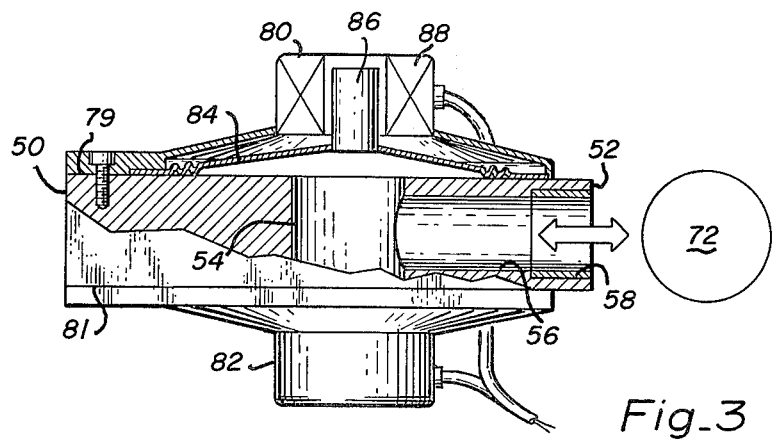
Fig_3
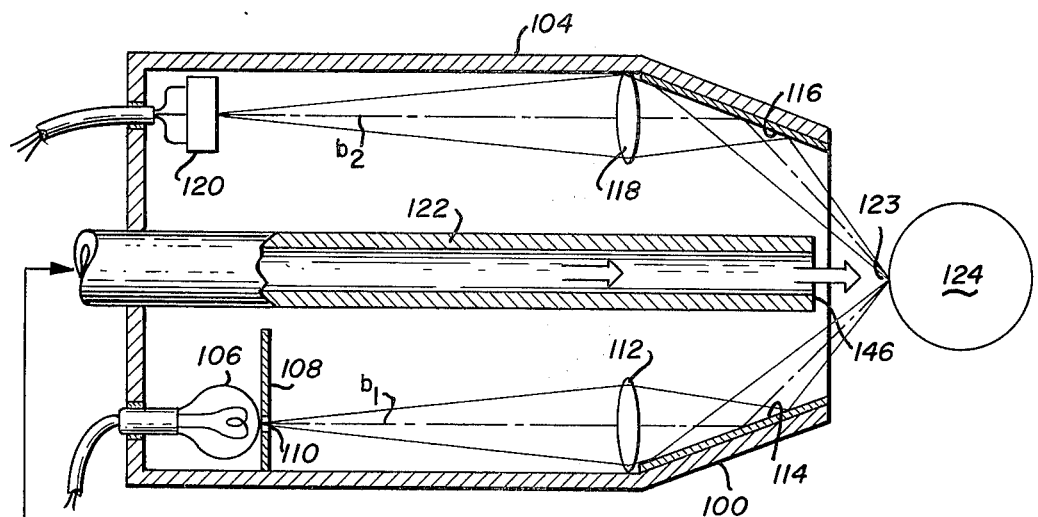
Fig_4
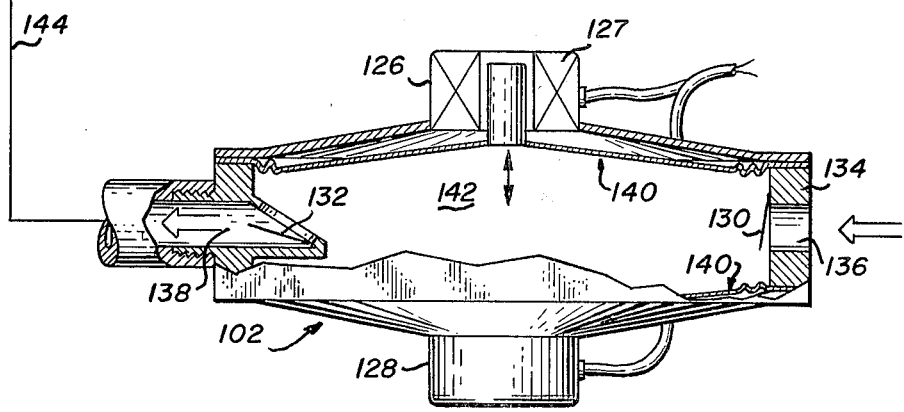
INVENTOR.
ANTHONY R. KRIEBEL
BY
Lowhurst & Hamrick
ATTORNEYS

NONCONTACTING PRESSURE MEASURING APPARATUS

BACKGROUND OF THE INVENTION

1. Field of the Invention

The present invention relates generally to pressure measuring apparatus and more particularly to apparatus for measuring the internal pressure within a pressurized container having a deformable wall structure. The present invention has particular application for use as a tonometer for measuring the pressure within a human eyeball to detect glaucoma.

2. Discussion of the Prior Art

Although the principles of the present invention are also applicable to apparatus for inspecting the internal pressure of many types of pressurized containers having deformable wall structures, the preferred embodiment disclosed herein relates to apparatus for measuring the fluid pressure within the human eyeball commonly referred to as tonometers.

One of the major causes of human blindness is an eye disease called glaucoma for which the primary initial symptom is increased intraocular pressure. The disease is a fairly common characteristic of aging, but it can be treated if it is detected before the pressure becomes excessive. Hence, tests to detect the onset of glaucoma are becoming more customary during routine physical examinations. Normally, the intraocular pressure of the human eye is equivalent to that of a water column of about 6 to 12 inches high, but with severe glaucoma, this pressure can increase to a pressure of 30 inches of water or more. Since the eye is basically a pressurized sphere of fluid enclosed by a membrane under tension, it has several modes of oscillation, and may be compared to a raindrop held together by surface tension. Theoretically, the resonance frequency of each vibratory mode increases with the square root of the difference between the internal and external pressures. In its lowest mode of oscillation, an eyeball deflects nearly ellipsoidally with the corresponding resonant frequency being about 45 cycles per second for a normal eye, according to the following theoretical equation:

$$F(H_z) = F_n \frac{\sqrt{gH}}{\pi A}$$

where for normal eyes
- $a$ is the radius of the eyeball (about one-half inch $\pm$ 20%),
- $H$ is the intraocular pressure of the eyeball (about 0.8 $\pm$ 0.2 feet of water, or 14–25 mm $H_o$).
- $g$ is the acceleration of gravity (32.2 $fps^2$), and
- $f_n$ is the eigenvalue (1; 1.94; 3; and 4.19; for first four vibrational modes).

Initial measured values of the lowest resonant frequency for normal human eyes in vivo have, however, been found to be about twice as large as predicted by the previous simple equation; probably because of the stiffness of the membrane enclosing the eye and the restraint of the head structure.

Contacting tonometers have been proven clinically to be excellent detectors of intraocular pressure. However, like all existing tonometers their attractiveness is reduced by their requirement that direct mechanical contact be made with the eye, such contact causing great discomfort unless a local anesthetic is administered. The requirement for contact also makes the measurement more difficulat and introduces errors due to tear formations and the variation of the physical properties of the cornea. Such prior art apparatus is disclosed in the U.S. Patents to Mages U.S. Pat. No. 2,519,681, MacKay et al U.S. Pat. No. 3,049,001, Sittel U.S. Pat. No. 3,070,087 and Keiper U.S. Pat. No. 3,192,765.

One attempt at providing a noncontacting tonometer is disclosed in the U.S. Patent to Stauffer U.S. Pat. No. 3,181,351 wherein a calibrated single puff of air is directed toward the corneal area of an eye under test causing a deformation thereof, and electro-optical means are provided for determining the degree of such deformation as a measure of the intraocular measure. However, because of the method in which the eye is stimulated and the type of electro-optical means employed to measure the resultant surface deflection, the reliability of measurements made with such apparatus is questionable. For example, since the detector is primarily sensitive to the intensity of light reflected from the eyeball surface, and the intensity is critically affected by the separation of the instrument from the eyeball as well as the reflectivity of the eyeball surface, it is difficult to obtain repeatable data with any reasonable degree of precision.

SUMMARY OF THE PRESENT INVENTION

It is therefore an object of the present invention to provide a noncontacting means for measuring the internal pressure within a pressurized container having a deformable wall structure.

Another object of the present invention is to provide a noncontacting tonometer for measuring the intraocular pressure of a human eyeball.

In accordance with the present invention, a noncontacting tonometer is provided which includes a means for developing and directing a pressure modulated stream of air or reciprocating column of air onto an eyeball under test in a manner such that the eyeball is caused to vibrate at frequencies within a selected frequency range, a means for developing and focusing a beam of light upon a reflective surface of the eyeball, and a means responsive to the light reflected from the eyeball for detecting the vibratory oscillations thereof and determining the resonant frequency of the eyeball. The light responsive means includes a light spot position sensing detector and collecting optics for focusing a spot of light reflected from the eyeball surface onto the detector. As the eyeball surface oscillates under the influence of the air stream, the detector measures such oscillation and develops an output signal which is phase related to the electrical signal used to modulate the air stream. Either the amplitude of the output signal and/or the phase relation between the two signals is then used to determine the resonant frequency of the eyeball. In addition, the output signal can be filtered so that only, the eyeball displacement at or near the stimulation frequency is detected.

One of the primary advantages of the present invention is that the apparatus is substantially insensitive to the reflectivity of the eyeball under test, and is primarily responsive to the eyeball surface displacement caused by the stimulating air stream.

Another advantage of the present invention is that the frequency of the stimuli can be easily swept over any suitable range of frequencies so that the resonant frequency of the eye can be accurately determined.

Still another advantage of the present invention is that since the phase relationship between the stimulating source and the responsive detector output are compared to determine resonance, the resonant frequency can be obtained more accurately than by simply measuring the vibratory amplitudes of the eyeball surface.

Still another advantage of the present invention is that the apparatus can be used to test an eyeball with the eyelids open or closed.

These and other objects and advantages of the present invention will become apparent to those skilled in the art after having read the following detailed description of the preferred embodiments which are illustrated in the several figures of the drawing.

IN THE DRAWING

FIG. 1 is a schematic diagram illustrating the operative characteristics of the present invention.

FIG. 1A is a schematic diagram illustrating a modification of the FIG. 1 embodiment.

FIGS. 2 and 3 are schematic diagrams illustrating a tonometer in accordance with a preferred embodiment of the present invention.

FIG. 4 illustrates an alternative embodiment of a tonometer in accordance with a preferred embodiment of the invention.

DETAILED DESCRIPTION OF THE PREFERRED EMBODIMENT

In accordance with the present invention, a tonometer instrument is provided which does not require contact with the eye, and operates on the principle that when an oscillatory force is applied to a vibratory system, such as an eyeball, the amplitude of the vibrational motion is maximum, and the phase angle between the force and the motion shifts by 180° as the forcing (stimulus) frequency passes the lowest resonant frequency of the system. That is, the force is nearly in phase with the motion below the resonant frequency and nearly in phase with the acceleration above the resonant frequency. As the forcing frequency passes through the resonant frequency, the amplitude of the vibrational motion of the eyeball is maximum and the vibrating forces applied to the eyeball are precisely in phase with the oscillatory velocity of the eyeball independent of damping from frictional losses in the tissues and fluid of the eye. A measure of the lowest resonant frequency may thus be obtained by determining the forcing frequency at which the phase angle of the applied force differs from that of the vibrating eyeball by 90°. The resonant frequency can then be related to intraocular pressure by extant clinical data and well established theory for the oscillation of pressurized spheres of fluid. By measuring additional resonant frequencies and amplitudes for higher modes of oscillation, supplementary information can be deduced about some of the physical properties of the eye other than the internal pressure; such as, for example, radius, scleral rigidity, internal damping, etc.

Referring now to FIG. 1 of the drawing, the operational characteristics of a preferred embodiment of the present invention are shown schematically with relation to a single eyeball 10 or other spherically shaped pressurized container. The apparatus includes a stimulus generator 12 for developing ocilatory fluid pressure waves which are utilized to stimulate the eyeball 10 without making direct physical contact with it. Generator 12 may take the form of a device for causing a column of air between the device and the eyeball to reciprocate at the driving frequency, or may take the form of a device for generating and directing a pulsating pressure modulated stream of air against the eyeball, to thereby cause periodic deformation of eyeball 10.

Generator 12 is preferably of a type which can be electrically driven at frequencies up to at least 100 Hz by a variable frequency source such as the electrical oscillator 14 so that the frequency of the pressure waves 13 used to stimulate eyeball 10 can be swept over a range of frequencies including at least one resonant frequency of eyeball 10. It will be appreciated that in response to the applied pressure waves, eyeball 10 will be periodically deformed and caused to oscillate, in a first oscillatory mode, between a vertical ellipsoidal configuration 16 and a horizontal ellipsoidal configuration 18, and the amount of deflection of the eyeball surface for a given stimulus pressure will vary from minimum values at excitation frequencies remote from the resonant frequency to a maximum at the frequency of resonance.

In order to detect the relative phase and amplitude of the eyeball surface deflections, a focusing lens 20 is used to focus a narrow slit of light from the source 22 onto the surface of eyeball 10, as at point 24 on the unstimulated eye surface. A collecting lens 26 is positioned relative to lens 20 so that its principle otpical axis $a_2$ intersects the optical axis $a_1$ of lens 20 at point 24. Thus, light reflected from the surface of eyeball 10 is collected and focused by lens 26 to develop a spot on the sensitive surface 28 of a photodetector 30, such as the PIN-SPOT/2D position sensing photodetector manufactured by United Detector Technology of Santa Monica, Calif.

As illustrated in exaggerated form in FIG. 1, the position of the illuminated surface of eyeball 10 will oscillate between the points 23 and 25 as eyeball 10 is deformed in response to pressures exerted by stream 13. Consequently, the position upon detector surface 28 that the spot cast upon eyeball 10 is imaged will oscillate similarly between the corresponding points 35 and 37. Photodetector 30 is of the type which, when energized by a potential source 40 provides electrical output signals on the leads 32 and 34, respectively, having an interrelationship which is dependent upon the location of the centroid of the incident light spot. When the incident light is focused to form a spot having its centroid located at exactly the device center, e.g., at point 36, the electrical signals developed on the leads 32 and 34 are equal. However, when the light spot is moved over the surface 27, the magnitudes of the electrical signals developed on leads 32 and 34 change in proportion to the position of the centroid relative to the center point 36; one signal being negative with respect to the center spot signal, and the other being positive. Accordingly, the difference between the two signals developed on leads 32 and 34 can be used to provide an analog error signal proportional to the displacement of the eyeball surface.

Note that although the intensity per unit area of the light spot imaged on detector surface 28 may vary due to differences in reflectivity of eyeball surface, tear formation or other reasons, the output signals developed by photodetector 30 are independent thereof since the device is only sensitive to the position of the centroid of the light spot cast upon its sensitive surface 28. This means that differences in the reflective characteristics of an eyeball surface will not affect the test results. In other words, in contrast to the device disclosed in the aforementioned Stauffer patent, the present apparatus is insensitive to the intensity of the light used to measure the stimulus response.

A differential amplifier 42 is utilized to compare the signals developed on lines 32 and 34, and to generate an analog output signal which is proportional to the difference between the amplitudes of the signals. Note that since the surface motion of eyeball 10 is not necessarily sinusoidal, neither will the output of amplifier 42 necessarily be sinusoidal. Although the amplitudes of the output signals developed by amplifier 42 will approach a maximum when the resonant frequency is reached, the damping caused by eyeball structure, mounting, etc., flattens the resonant peak sufficient to make it difficult to determine the actual frequency of resonance.

However, because of the phase relationshiip between the input stimulating energy (modulated air stream) and the responsive eyeball surface displacement, a simple phase comparison mechanism such as the oscilloscope 44 can be used to provide a rather precise indication of resonance. To provide such indication, the output of amplifier 42 is input to the vertical axis of oscilloscope 44, and the output of signal generator 14 is input to the horizontal axis. Since both signals are at the same frequency because both are derived from the same source, i.e., signal generator 14, a lisajous figure will be developed on the oscilloscope face 46 which, even though probably not a regular ellipsoid lisajous figure, will be indicative of both the amplitude of the eyeball oscillation and the phase difference between the stimulus and response signals. As the frequency of the stimulus signal is swept from a sub-response frequency past the lowest resonant frequency of the eyeball, the CRT trace 45 will change from a more or less straight line angled at about 45° to distorted ellipse at resonance and then to another straight line at 135°.

By setting the frequency of oscillator 14 at some normal value, one can cause the CRT trace to "point" to the upper left for low intraocular pressures and to the upper right for high pressures. Hence, a direct objective test for glaucoma is possible without requiring that electronic adjustments or clinical evaluations be made. The test is made by simply positioning the device so that the intersection of the axes $a_1$ and $a_2$ coincides with the unstimulated eyeball 10 as illustrated in FIG. 1. The proper positioning will be indicated by a zero DC voltage output from amplifier 42 which can be read on a simple DC voltmeter 43 responsive to only the DC voltage output of amplifier 42.

Alternatively, oscilloscope 44 could be replaced by an envelope detector, responsive to the output of amplifier 42 alone, and recording means responsive to the detector output so that the displacement amplitudes of the eyeball surface are recorded as the modulating frequency of the fluid stream is varied. This will result in the generation of a bell shaped response as the stimulus frequency passes through resonance but because of the high degree of damping, it will be difficult to determine the resonant frequency from such data. In order to provide a completely automatic indication of resonant frequency alone, the control and indicator apparatus illustrated in FIG. 1A could be substituted for oscilloscope 44. In this case, the output signals from oscillator 14 and differential amplifier 42 are input to a phase detector 47 whose output is used to drive a servo 49. Servo 49 in turn drives oscillator 14 directed to the resonant frequency of the eyeball under test. The resonant frequency may thus be indicated by a frequency select dial (not shown) on oscillator 14 or a simple frequency counter 51 responsive to the output of oscillator 14.

Turning now to FIGS. 2 and 3 of the drawing, a preferred embodiment of the present invention is shown schematically in broken section top and side views respectively. FIG. 3 is a partial side section taken along the line 3—3 of FIG. 2. As illustrated, the embodiment includes a solid generally rectangular shaped body 50 having one corner removed as indicated at 53 to enable the device to be positioned close to eyeball 52. As best shown in FIG. 3, body 50 is provided with a cylindrical vertically directed opening 54 passing completely therethrough and a cylindrical passage 56 extending horizontally through block 50 from face 53 to intersect opening 54 and provide a communicating passageway between opening 54 and face 53. Passageway 56 may also be provided with a sleeve 58 at the intersection with face 53 to provide an exit orifice 59 for air passing through passageway 56.

Horizontally extending cylindrical openings 60 and 62 are also provided in block 50 proximate the edges 64 and 66 respectively. A focusing lens 68 is mounted within opening 60 for focusing light from a source 70 to a point P outside of face 53 at which the surface of eyeball 72 is initially positioned. A collcting lens 74 is positioned within opening 62 for focusing light reflected from point P onto the sensitive surface 76 of a photodetector 78 of the type disclosed above in FIG. 1, the detector 78 being suitably positioned at the end of opening 62.

Mounted to the top and bottom surfaces 79 and 81, respectively, of member 50 are a pair of electromechanical transducers or loudspeakers 80 and 82, which includes a diaphragm 84 drivingly attached to an armature 86 disposed for reciprocating movement inside of field windings or coil 88. Loudspeakers 80 and 82 are commonly energized through a single cable 90 so as to oscillate to and fro in synchronism when energized by a suitable source of alternating current.

In operation with an alternating current of selectable frequency applied to the coils 88 of loudspeakers 80 and 82, the diaphragms 84 will be driven inwardly to increase pressure within opening 54 and force a column of air out orifice 59 and against the surface of eyeball 52. However, on the next half-cycle diaphragms 84 will be withdrawn away from each other to reduce the pressure in opening 54 and thereby draw the column of air back into passageway 56, thus causing a slight reduction in pressure at the surface of eyeball 52. The sequence will be repeated for each half-cycle of the input energy. As the reciprocating column of air oscillates into and out of orifice 59, eyeball 52 is stimulated and the degree of resultant response is measured by detector 78 as the light beam 79 is caused to sweep back and forth across its face. The output of detector 78 is fed into suitable indicator circuitry, or the like, such as illustrated in FIGS. 1 and 1A.

In FIG. 4 of the drawing, an alternative embodiment for developing a continuously flowing pulsating fluid stream is illustrated which includes an eyeball stimulating and detecting head 100 and cooperating fluid stream generator 102. Head 100 includes an outer housing 104 which encloses a lamp 106 and an associated slit mask 108 for providing a well defined line source of light at 110. Head 100 also includes a focusing lens 112, a first reflecting mirror 114, a second reflecting mirror 116, a collecting lens 118 and a photodetector 120. Extending through the middle of housing 104 is a conduit 122 through which a modulated air stream is pumped to stimulate the eyeball 124. The mirrors 114 and 116 are inclined at angles relative to the principle axes $b_1$ and $b_2$ of lenses 112 and 118 respectively, so as to cause their intersection at a point 123 positioned a suitable distance from the orifice 125. Although not shown in the drawing, it will be appreciated that suitable instrument support structures such as that illustrated in the Keiper patent referenced above is also provided for holding the instrument head 104 at a suitable test distance from eyeball 124.

In order to develop the above mentioned frequency modulated fluid stream for exciting eyeball 124, the simple electrically driven fluid stream or other suitable apparatus may be utilized. Generator 102 includes a pair of opposed electromechanical transducers 126 and 128 similar to those illustrated in FIGS. 2 and 3. Transducers 126 and 128 are mounted to the open ends of an annular frame 134 having an inlet opening 136 on one side and an exit opening 138 on the other side. Flapper valves 130 and 132 are provided at the inlet and exit openings 136 and 138 respectively, and cooperate with transducers 126 and 128 to pump air in the direction indicated by the arrows. Transducers 126 and 128 include electromagnetically driven diaphragms 140 which are driven alternately towards and away from each other in synchronism by the application of alternating current to the windings 127.

In operation, lamp 106 is turned on, and instrument head 104 is moved toward eyeball 124 until the reflected beam $b_2$ is focused onto the center of photodetector 120. Centering of the beam is indicated by a zero DC output from the ammplifier 42 (see. FIG. 1). With instrument head 104 so positioned, generator 102 is then energized by the oscillator 14. As disphragms 140 are displaced inwardly towards each other during every other half-cycle of the input signal, the pressure within chamber 142 increases causing valve 130 to close inlet 136 and open valve 132 to create a pressure wave in the outlet 138. As diaphragms 140 are drawn back into the position illustrated during the remaining half-cycles of the input signal, pressure within chamber 142 is reduced so that valve 132 is closed and valve 130 is opened to allow outside air to be drawn in. Note that generator 102 could also be used to pump other fluids through the system. For example, a medicated gas or anesthesizing gas might be pumped through the system. Liquid might also be pumped in some cases. This cycle is repeated at the oscillator frequency.

Note that the effect is to force a train of pressure waves or pulses of air at the driving frequency through the connecting tube 144 and conduit 122 so that as each pulse exits at port 146 it applies a stimulating force to eyeball 124. The frequency of the stimulating forces being directly proportional to the frequency of the input signal from oscillator 14. As explained with reference to FIG. 1, the output of detector 120 will be displayed by a suitable display means as the excitation frequency is varied over a selected range to determine the pressure characteristics of eyeball 124.

Although the apparatus described above has been particularly directed to an embodiment suitable for tonometer applications, it will be appreciated that similar apparatus can be used to inspect produce such as fruits, vegetables, eggs, etc., in a conveyor line, sense liquid level or pressure in closed containers, sense pressurization or pressurized containers, determine the flexiblity of flexible surfaces and many other applications. Accordingly, it is intended that the invention not be limited to the particular apparatus disclosed and that the claims be interpreted as covering all applications, modifications and alternations as fall within the true spirit and scope of the invention.

What is claimed is:

1. A noncontacting apparatus for measuring internal pressure within an eyeball having a deformable wall surface comprising:
   stimulus generating means developing continuously oscillating pressure waves of a fluid and for directing such waves upon said deformable wall surface of the eyeball under test to cause responsive vibratory deflection thereof, said pressure waves having an oscillating frequency variable over a range of frequencies including a resonant frequency of said eyeball and said stimulus generating means being spaced apart from said eyeball by said fluid;
   means for directing a beam of light upon said surface to develop a reflected light beam;
   light detecting means responsive to said reflected light beam and operative to develop an electrical signal commensurate with the deflection of said surface; and
   indicating means responsive to said electrical signals and operative to indicate said resonant frequency.

2. A noncontacting apparatus as recited in claim 1 wherein said stimulus generating means includes means for alternately increasing and decreasing the pressure at said surface.

3. A noncontacting apparatus as recited in claim 1 wherein said light detecting means includes a photodetector having a photosensitive face, and a lens system for focusing said reflected light beam to a spot on said face, said photodetector being operative to develop said electrical signals in response to a position of said spot on said face.

4. A noncontacting apparatus for measuring internal pressure within a pressurized container having a deformable wall surface, comprising:
   stimulus generating means developing continuously oscillating pressure waves of a fluid and for directing such waves upon said deformable wall surface of the container under test to cause responsive vibratory deflection thereof, said pressure waves having an oscillating frequency variable over a range of frequencies including a resonant frequency of said container, said stimulus generating means being spaced apart across said fluid from said container and including means for developing a continuously flowing, pulsating fluid stream having pulsatory frequency within said range of frequencies;
   means for directing a beam of light upon said surface to develop a reflected light beam;
   light detecting means responsive to said reflected light beam and operative to develop an electrical signal commensurate with the deflection of said surface; and indicating means responsive to said electrical signals and operative to indicate said resonant frequency.

5. A noncontacting apparatus for measuring internal pressure within a pressurized container having a deformable wall surface, comprising:

stimulus generating means developing continuously oscillating pressure waves of a fluid and for directing such waves upon said deformable wall surface of the container under test to cause responsive vibratory deflection thereof, said stimulus generating means and said container being spaced apart across said fluid and said pressure waves having an oscillating frequency variable over a range of frequencies including a resonant frequency of said container;

means for directing a beam of light upon said surface to develop a reflected light beam;

light detecting means responsive to said reflected light beam and operative to develop an electrical signal commensurate with the deflection of said surface;

indicating means responsive to said electrical signals and operative to indicate said resonant frequency;

a signal source for developing an oscillatory signal for driving said stimulus generating means; and said indicating means including a phase comparing means responsive to said oscillatory signal and said electrical signal and being operative to develop a phase signal proportional to the phase relationship therebetween.

6. A noncontacting apparatus as recited in claim 5 and further comprising a servo means responsive to said phase signal and operative to vary the frequency of said oscillatory signal and coincide with said resonant frequency.

7. A noncontacting apparatus for measuring the internal pressure within a pressurized container having a deformable wall structure, comprising:

a signal source for developing a variable frequency signal;

a stimulus generating means responsive to said variable frequency signal and operative to develop oscillatory pressure waves for direction upon a surface of the pressurized container under test to cause responsive surface motion;

means for projecting a beam of light onto said surface to provide a light spot thereon;

light detecting means responsive to light reflected from said surface and operative to develop an electrical signal commensurate with the change in position of said light spot due to said surface motion; and indicator means responsive to said variable frequency signal and said electrical signal and operative to indicate the phase relationship therebetween, whereby said phase relationship indicates the resonant frequency of said container when said variable frequency signal is swept over a range of frequencies including said resonant frequency.

8. A noncontacting apparatus as recited in claim 7 wherein said stimulus generating means develops a continuously flowing, pulsating fluid stream.

9. A noncontacting apparatus as recited in claim 7 wherein said stimulus generating means alternately increases and decreases the pressure on said surface.

10. A noncontacting apparatus as recited in claim 7 wherein said stimulus generating means includes means forming a chamber open on opposite sides and having a communicating passageway extending from said chamber to an external orifice, a first electromechanical transducer forming a closure on one side of said chamber, and a second electromechanical transducer forming a closure on the opposite side of said chamber, said first and second transducers being commonly energized by said signal source to alternatey increase and decrease the pressure within said chamber thereby creating oscillatory pressure waves within said passageway for application to said surface when said orifice is positioned proximate said surface.

11. A noncontacting tonometer for measuring the internal pressure within an eyeball comprising:

means for generating a continuously vibrating stream of air whose frequency of vibration is swept through a predetermined spectrum, and for directing said stream of air against the eyeball;

means for generating and directing a beam of light against the eyeball in such a manner as to form a reflected beam, said reflected beam having a characteristic which varies with the vibration of the light intercepted surface of the object;

means responsive to said reflected beam and operative to develop a first signal having a frequency which is commensurate with the frequency of said characteristic; and means for comparing the phase of said first signal with the phase of said vibrating stream of air and to derive an indication of their phase relationship.

12. A noncontacting tonometer for measuring the internal pressure of an eyeball comprising:

means for generating a first continuously vibrating signal and sweeping said first signal through a predetermined spectrum of frequencies;

means responsive to said first signal and operative to generate a stream of air which continuously vibrates at the frequency of said first signal;

means for directing said stream of air against the surface of the eyeball;

means for directing a beam of light against the surface of the eyeball and forming a reflected beam, said reflected beam having a characteristic which vibrates with the frequency of the eyeball surface reflecting said beam;

means responsive to said reflected beam and operative to develop a second signal which has a frequency commensurate with said characteristic of said reflected beam; and means for comparing at least one selected characteristic of said first and second signals to derive therefrom a measure of the internal pressure of the eyeball.

* * * * *